United States Patent
Kang

(10) Patent No.: US 7,649,579 B2
(45) Date of Patent: Jan. 19, 2010

(54) LIQUID CRYSTAL DISPLAY OF LINE ON GLASS TYPE

(75) Inventor: Pil Sung Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 531 days.

(21) Appl. No.: 11/475,124

(22) Filed: Jun. 27, 2006

(65) Prior Publication Data

US 2006/0290646 A1    Dec. 28, 2006

(30) Foreign Application Priority Data

Jun. 28, 2005    (KR) .................. 10-2005-0056552

(51) Int. Cl.
  *G02F 1/133*    (2006.01)
  *G09G 3/36*    (2006.01)
(52) U.S. Cl. .......................... 349/33; 345/98
(58) Field of Classification Search ............ 349/33; 345/98, 99, 100
  See application file for complete search history.

(56) References Cited

U.S. PATENT DOCUMENTS

| 5,883,609 A | 3/1999 | Asada et al. |
| 7,554,517 B2 * | 6/2009 | Baum et al. .............. 345/89 |
| 7,576,734 B2 * | 8/2009 | Kimura .................. 345/204 |
| 2004/0160400 A1 | 8/2004 | Hong |
| 2005/0110738 A1 | 5/2005 | Kim et al. |
| 2006/0170637 A1 | 8/2006 | Lin |

FOREIGN PATENT DOCUMENTS

| DE | 195 40 146 A1 | 5/1996 |
| GB | 2409096 A | 6/2005 |
| GB | 2421627 A | 6/2006 |
| JP | 5-107551 A | 4/1993 |
| JP | 2000-171774 A | 6/2000 |

* cited by examiner

*Primary Examiner*—David Nelms
*Assistant Examiner*—David Y Chung
(74) *Attorney, Agent, or Firm*—Birch, Stewart, Kolasch & Birch, LLP

(57) ABSTRACT

A line-on-glass type liquid crystal display device, which includes a gate drive integrated circuit mounted on a liquid crystal display panel for supplying a gate signal to the liquid crystal display panel, and a data drive integrated circuit for supplying a data voltage to the liquid crystal display panel. Further, the data drive integrated circuit includes an output circuit having effective output channels to which the data voltage is supplied and dummy output channels to which at least any one of the data voltage and a common voltage is supplied. Also included is a channel selecting part for selectively supplying any one of the data voltage and the common voltage to at least anyone of the dummy output channels.

12 Claims, 6 Drawing Sheets

LIQUID CRYSTAL DISPLAY OF LINE ON GLASS TYPE

This application claims priority to Korean Patent Application No. 10-2005-0056552 filed on Jun. 28, 2005, which is hereby incorporated by reference.

BACKGROUND OF THE INVENTION

1. Field of the Invention

The present invention relates to a liquid crystal display device, and more particularly to a line-on-glass type liquid crystal display device that prevents a deterioration in a picture quality of the liquid crystal display device.

2. Description of the Related Art

A liquid crystal display device controls the light transmittance of liquid crystal having dielectric anisotropy by using an electric field, thereby displaying a picture. Further, the liquid crystal display device includes a liquid crystal display panel having liquid crystal cells arranged in a matrix shape and a drive circuit for driving the liquid crystal display panel. The liquid crystal display panel controls the light transmittance of the cells in accordance with a pixel signal, thereby displaying a picture.

In addition, the drive circuit includes a gate driver for driving gate lines of the liquid crystal display panel, a data driver for driving data lines, a timing controller for controlling the drive timing of the gate driver and the data driver, and a power supply for supplying power signals required for driving the liquid crystal display panel and the drive circuits.

Further, the data and gate drivers are divided into a plurality of integrated circuits (ICs) made in a chip form. Each of the integrated drive ICs is mounted in an IC area opened on a TCP (tape carrier package) or is mounted on a base film of the TCP by a COF (chip on film) method. Each IC is also electrically connected to the liquid crystal display panel by a TAB (tape automated bonding) method. Further, the drive IC can also be directly mounted on the liquid crystal display panel by a COG (chip on glass) method.

The drive ICs mounted on the liquid crystal display panel by the COG method receive pixel data and control signals from the timing controller mounted on a main PCB (power control board) and power signals from the power supply through line-on-glass (LOG) type signal lines which are formed in the liquid crystal display panel and a corresponding FPC (flexible printed circuit).

Recently, even when the drive ICs are connected to the liquid crystal display panel through the TCP, the PCB is removed by adopting the LOG signal lines, thereby making the liquid crystal display device thinner. That is, the gate PCB which transmits relatively less signals is removed, and the signal lines which supply gate control signals and power signals to the gate drive ICs are formed in the LOG type lines on the liquid crystal display panel. Accordingly, the gate drive ICs mounted on the TCP receive the gate control signals from the timing controller and the power signals from the power supply through the following arrangement: main PCB→FPC->data PCB->data TCP->LOG signal line->gate TCP.

In more detail, FIG. 1 is a diagram representing an LOG type liquid crystal display device of the related art where a gate PCB is removed. As shown, the LOG type liquid crystal display device includes a main PCB 20 having a timing controller 22 and a power supply 24, a data PCB 16 connected to the main PCB 20 through a FPC 18, a data TCP 12 where a data drive IC 14 is mounted and which is connected between the data PCB 16 and a liquid crystal display panel 6, and a gate TCP 8 where a gate drive IC 10 is mounted and which is connected to the liquid crystal display panel 6.

Further, the liquid crystal display panel 6 is divided into a thin film transistor array substrate 2 and a color filter array substrate 4, which are bonded with a liquid crystal there between. Also, liquid crystal cells independently driven by the thin film transistors are respectively provided at each area defined by the crossing of gate lines GL and data lines DL of the thin film transistor array substrate 2. Each thin film transistor supplies a pixel signal from the data line DL to the liquid crystal cell in response to a scan signal from the gate line GL.

In addition, the data drive ICs 14 are connected to the data lines DL through a data pad of the liquid crystal display panel 6 and the data TCP 12, thereby supplying a data signal to the data line DL. Similarly, the gate drive ICs 10 are connected to the gate lines GL through a gate pad of the liquid crystal display panel 6 and the gate TCP 8, thereby supplying a gate signal to the gate line GL.

A LOG signal line group 26 include signal lines for power signals from the power supply 24 such as a gate low voltage, gate high voltage, common voltage, etc, and gate control signals supplied from the timing controller 22. On the other hand, as shown in FIG. 2, in an edge area of the color filter array substrate 4, a plurality of silver Ag dots 30a to 30d are formed to supply a common voltage to the common electrode formed in the color filter array substrate 4. That is, a common voltage VCOM from the common line LVCOM is supplied to the common electrode of the color filter array substrate 4 through the silver dots 30a and 30b.

However, as shown, the silver dots 30a to 30d are located in corner areas of the color filter array substrate 4. That is, in the related art, the part that supplies the common voltage VCOM is insufficient (e.g., too small of an area), therefore a picture quality deterioration phenomenon such as cross-talk, a greenish color, etc. is generated.

SUMMARY OF THE INVENTION

Accordingly, one of the objects of the present invention is to provide a line-on-glass type liquid crystal display device that prevents a deterioration in picture quality.

To achieve these and other objects of the invention, a line-on-glass type liquid crystal display device according to an aspect of the present invention includes a gate drive integrated circuit mounted on a liquid crystal display panel for supplying a gate signal to the liquid crystal display panel, and a data drive integrated circuit for supplying a data voltage to the liquid crystal display panel. Further, the data drive integrated circuit includes an output circuit having effective output channels to which the data voltage is supplied and dummy output channels to which at least any one of the data voltage and a common voltage is supplied. Also included is a channel selecting part for selectively supplying any one of the data voltage and the common voltage to at least any one of the dummy output channels.

A line-on-glass type liquid crystal display device according to another aspect of the present invention includes a liquid crystal display panel having pixel cells are arranged in a matrix shape, a gate drive integrated circuit mounted on the liquid crystal display panel for supplying a gate signal to the pixel cells, and a data drive integrated circuit mounted on the liquid crystal display panel for supplying a data voltage and a common voltage to the pixel cells.

In yet another aspect, the present invention provides a liquid crystal display device including a liquid crystal display panel having a thin film transistor array substrate and a color filter array substrate sandwiching a liquid crystal therebetween, a data drive circuit for supplying a data voltage to data lines of the liquid crystal display panel, a gate drive circuit for supplying a gate signal to gate lines crossing the data lines of the liquid crystal display panel, and a timing controller for providing control signals to the data and gate drive circuits so as to selectively drive thin film transistors included in the thin film transistor array substrate. Further, the data drive circuit includes an output circuit having a first set of output channels for supplying a data voltage to the data lines and having a second set of output channels for supplying a common voltage to the color filter array substrate.

Further scope of applicability of the present invention will become apparent from the detailed description given hereinafter. However, it should be understood that the detailed description and specific examples, while indication preferred embodiments of the invention, are given by illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
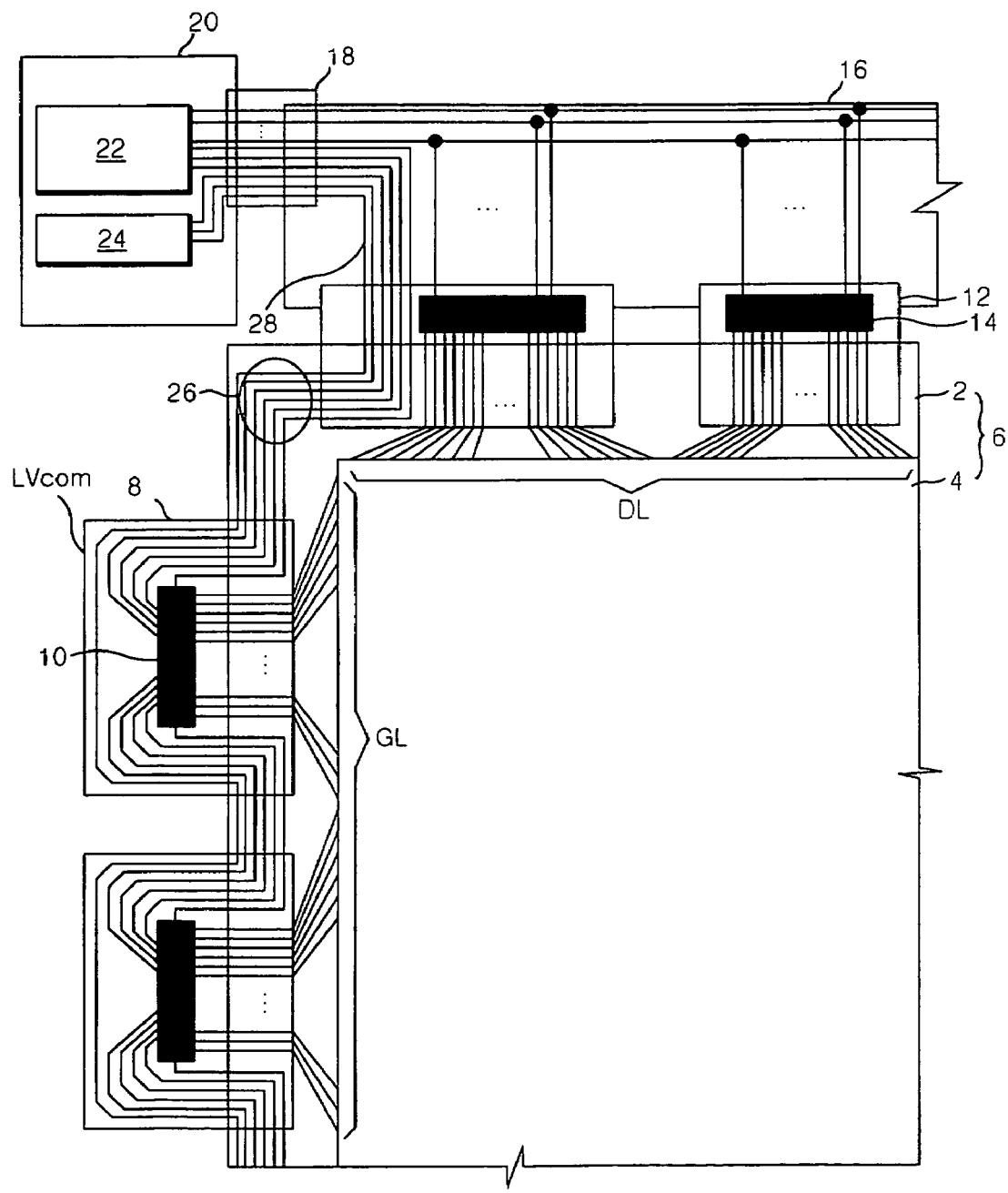
FIG. 1 is a diagram representing a line-on-glass type liquid crystal display device of the related art.
Figure 2:
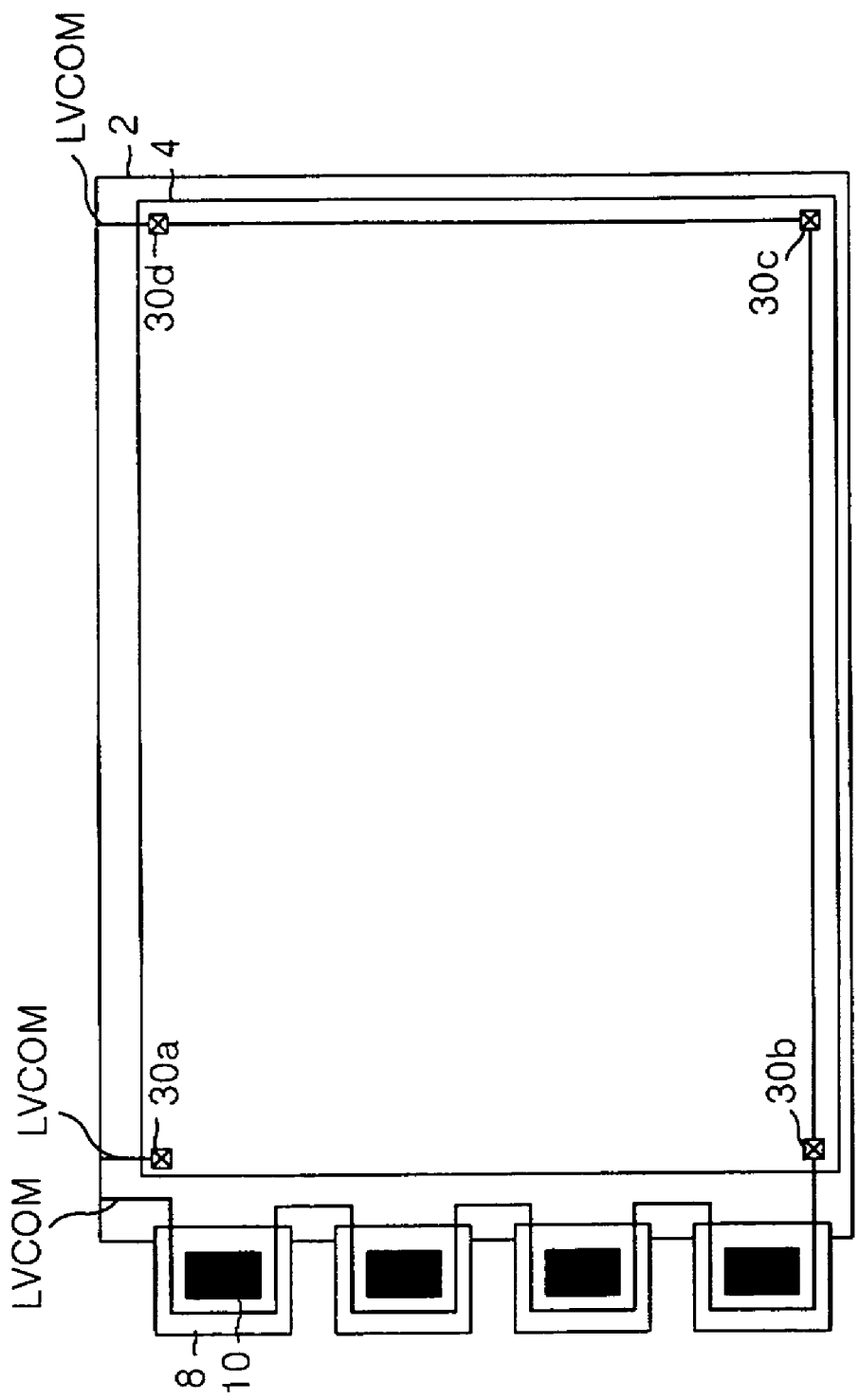
FIG. 2 is a diagram representing a common voltage of a common line being supplied to a color filter array substrate through a silver dot.
Figure 3:
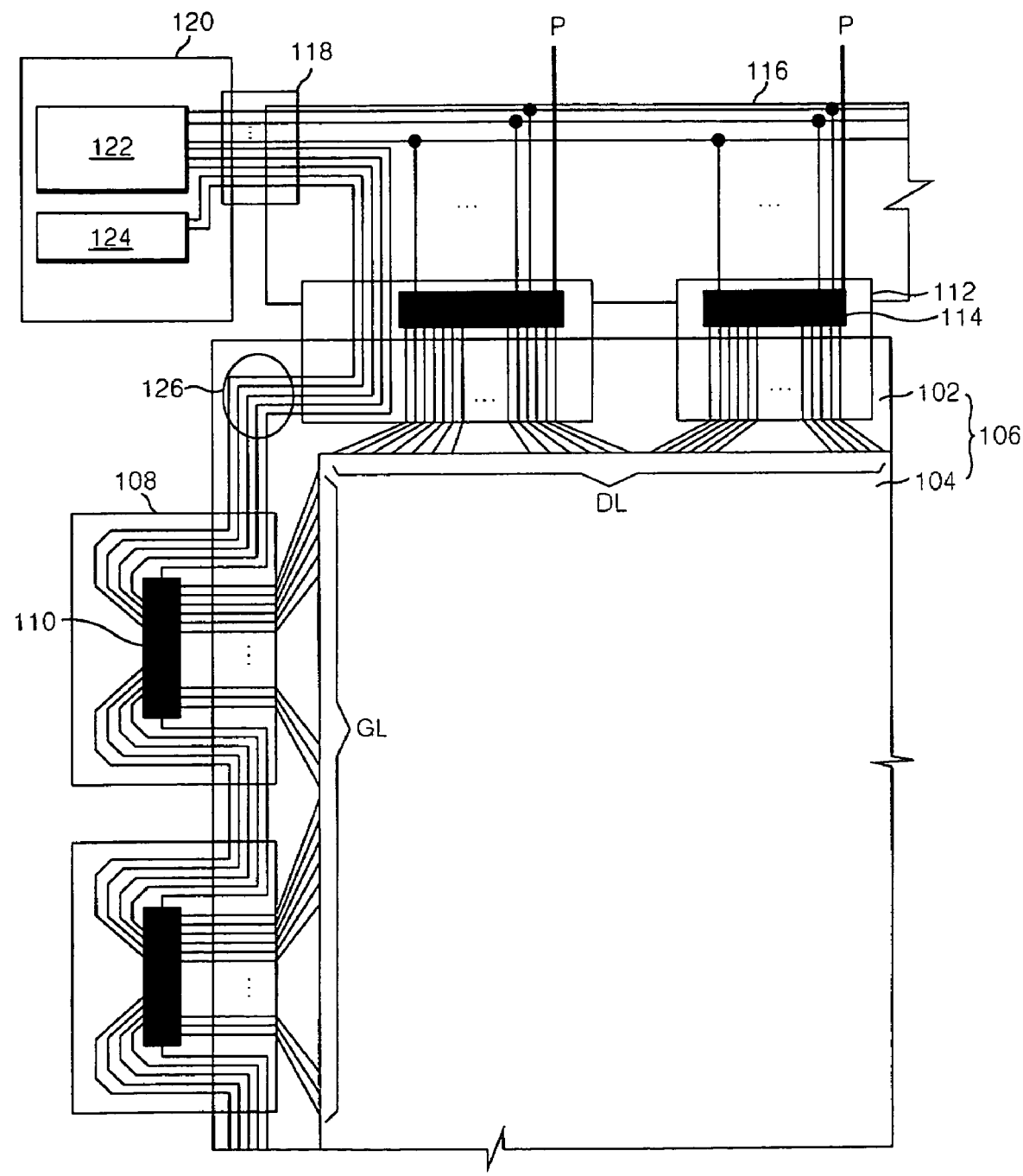
FIG. 3 is a diagram representing a line-on-glass type liquid crystal display device in accordance with an embodiment of the present invention.

Turning first to FIG. 3, which is a diagram representing an LOG type liquid crystal display device in accordance with an embodiment of the present invention. As shown, the LOG type liquid crystal display device includes a main PCB 120 having a timing controller 122 and a power supply 124. The display device also includes a data PCB 116 connected to the main PCB 120 through a FPC 118, a data TCP 112 where a data drive IC 114 is mounted and which is connected between the data PCB 116 and a liquid crystal display panel 106, and a gate TCP 108 where a gate drive IC 110 is mounted and which is connected o the liquid crystal display panel 106.

Further, the liquid crystal display panel 106 is divided into a thin film transistor array substrate 102 and a color filter array substrate 104, which are bonded with a liquid crystal therebetween. Also, liquid crystal cells independently driven by the thin film transistors are provided at each area defined by the crossing of gate lines GL and data lines DL of the thin film transistor array substrate 102. Each thin film transistor supplies a pixel signal from the data line DL to the liquid crystal cell in response to a scan signal from the gate line GL.

In addition, a LOG signal line group 126 includes signal lines for power signals such as agate low voltage, gate high voltage, common voltage, etc. supplied from the power supply 124, and gate control signals supplied from the timing controller 122. Further, the gate drive ICs 110 are connected to the gate lines GL through a gate pad of the liquid crystal display panel 106 and the gate TCP 108, thereby supplying gate signals to the gate lines GL.

In addition, the data drive ICs 114 are connected to the data lines DL through a data pad of the liquid crystal display panel 106 and the data TCP 112, thereby supplying data signals to the data line DL. Further, a common voltage VCOM is supplied to the liquid crystal display panel 106 using a dummy output channel.

Figure 4:
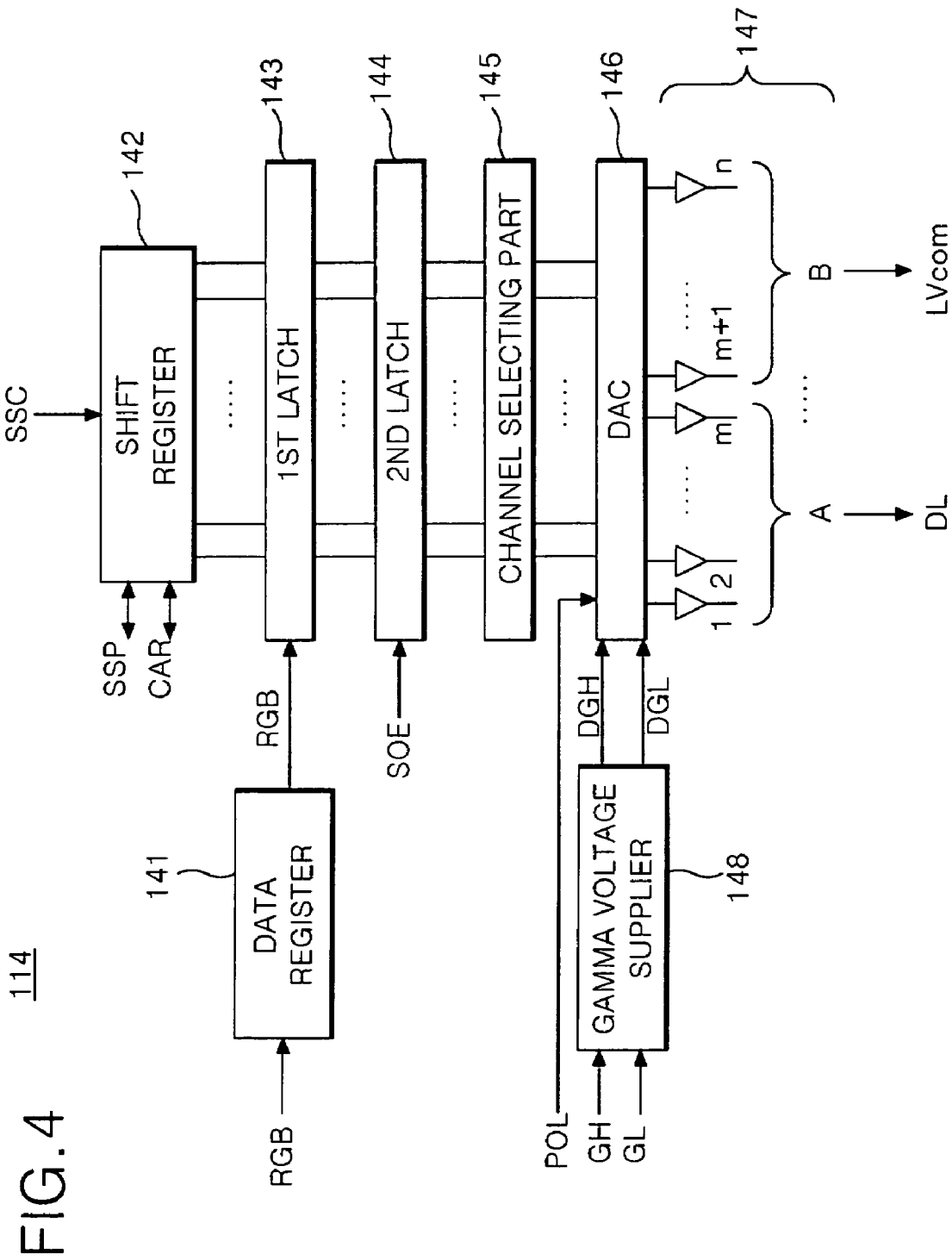
FIG. 4 is a diagram representing a data drive IC in FIG. 3.

Turning next to FIG. 4, which illustrates the data drive IC 114 shown in FIG. 3. As shown, the data drive IC 114 includes a data register 141 to which RGB data signals from the timing controller 122 are input, and a shift register 142 for generating a sampling clock. Also included is a first latch 143, a second latch 144, a channel selecting part 145, a digital/analog converter (DAC) 146 and an output circuit 147 connected between the shift register 142 and the data lines DL, A gamma voltage supplier 148 is also connected to the DAC 146.

In addition, the data register 141 supplies the digital RGB data signals from the timing controller 122 to the first latch 143. The shift register 142 shifts a source start pulse SSP from the timing controller 122 in accordance with a source sampling clock signal SSC to generate a sampling signal. Further, the shift register 142 shifts the source start pulse SSP to transmit a carry signal CAR to the shift register 142 in the next stage.

Also, the first latch 143 sequentially samples the digital RGB data signals from the data register 141 in response to the sampling signal, which is sequentially input from the shift register 142. The second latch 144 latches the data input from the first latch 143, and then simultaneously outputs the latched data in response to a source output enable signal SOE from the timing controller 122.

Figure 5:
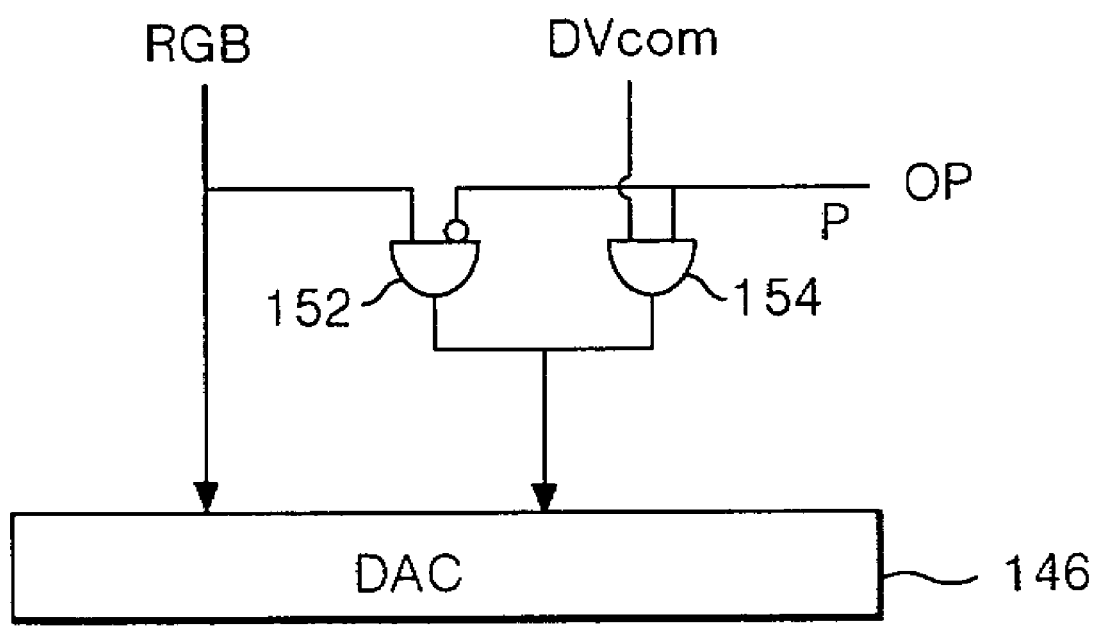
FIG. 5 is a diagram representing a circuit configuration of a channel selecting part of the data drive IC shown in FIG. 4.

In addition, the channel selecting part 145 selects a channel for supplying a data voltage to data lines DL and a channel for supplying a common voltage to the liquid crystal display panel 106 in response to a channel selection signal input from the outside. To this end, the channel selecting part 145, as shown in FIG. 5, includes an option pin OP to which a channel selection signal P is supplied, and first and second AND gates 152, 154.

The option pin OP is, for example, selectively connected to a voltage source and a ground to have a binary logic value of 2 bits. Accordingly, the channel selection signal P supplied to the channel selecting part 145 through the option pin OP has a value of '0' or '1'. In addition, as shown in FIG. 5, a first terminal of the first AND gate 152 receives the digital RGB data signals and a second terminal thereof is connected to the option pin OP to which the channel selection signal P is supplied.

A first terminal of the second AND gate 154 receives a digital common voltage signal DVOM and a second terminal thereof is connected to the option pin OP to which the channel selection signal P is supplied. Also, the first AND gate 152 and the second AND gate 154 are driven in accordance with the logic values which are contrary to each other.

For example, the first AND gate 152 supplies the digital RGB data signals to the DAC 146 if the channel selection signal P supplied through the option pin OP has a value of '0', and the second AND gate 154 supplies the digital common voltage signal DVOM to the DAC 146 if the channel selection signal P has a value of '1'.

In addition, the DAC 146 converts the digital RGB data signals from the second latch 144 using a gamma voltage DGH, DGL from the gamma voltage supplier 148. The gamma voltage DGH, DGL is an analog voltage which corresponds to each gray level of the digital input RGB data signals. That is, the DAC 146 converts the digital common voltage signal DVOM into the analog common voltage and converts the digital RGB data signals into the analog data voltage to be supplied to the output circuit 147.

Further, the output circuit 147 includes first to $m^{th}$ effective output channels A connected to the data line DL, and $(m+1)^{th}$ to $n^{th}$ dummy output channels B. That is, normal analog data voltages are applied to the first to $m^{th}$ effective output channels A, and the common voltage VCOM is output to the $(m+1)^{th}$ to $n^{th}$ dummy output channels B based on a user's selection.

Figure 6:
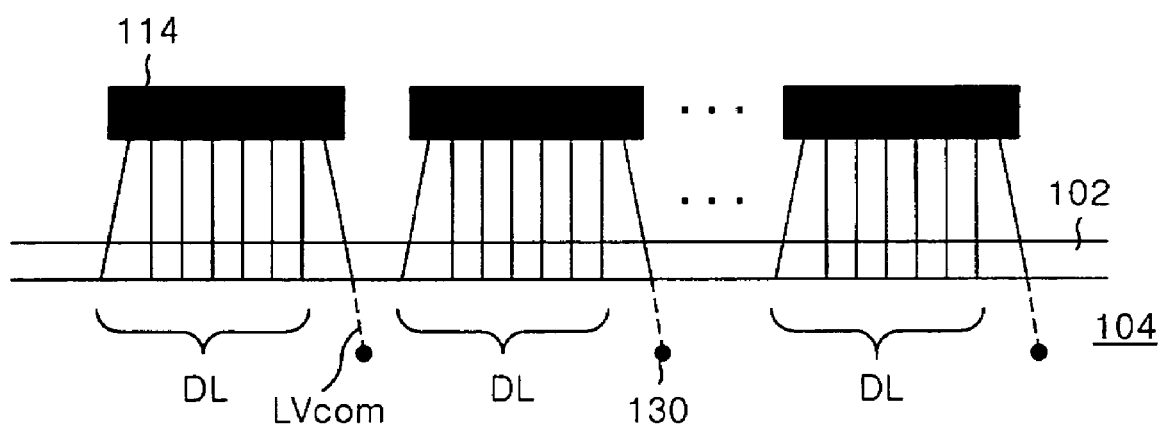
FIG. 6 is a diagram representing a common voltage being supplied to a color filter array substrate through the data drive IC.

In addition, as shown in FIG. 6, the common voltage VCOM supplied to the liquid crystal display panel 106 through the dummy output channels B of the data drive IC 114 can be applied to the common electrode of the color filter array substrate 104 through a silver dot 130. That is, in the present invention, at least any one of the dummy output channels B of the output circuit 147 can act as a common line LVCOM to which the common voltage is supplied.

In this way, the liquid crystal display in accordance with an embodiment of the present invention includes at least one common line LVCOM through which a common voltage is supplied to the liquid crystal display panel 106 for each data drive IC 114 by having the dummy output channels B of each of the data drive ICs 114 used as the common line LVCOM to which the common voltage is supplied. As a result, a space to which the common voltage is supplied becomes larger, thereby minimizing the difference of the common voltage in accordance with a location. Accordingly, when realizing a picture, it is possible to prevent a picture quality deterioration phenomenon such as crosstalk, a greenish color, etc.

As described above, the LOG type liquid crystal display device in accordance with the present invention has the dummy output channels of each of the data drive ICs used as the supply line of the common voltage, and thus the space to which the common voltage is supplied in the liquid crystal display panel is increased. Accordingly, it is possible to prevent the picture quality deterioration phenomenon such as crosstalk, a greenish color, etc.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A line-on-glass liquid crystal display device, comprising:
   a gate drive integrated circuit mounted on a liquid crystal display panel for supplying a gate signal to the liquid crystal display panel; and
   a data drive integrated circuit for supplying a data voltage to the liquid crystal display panel,
   wherein the data drive integrated circuit includes:
   an output circuit including effective output channels to which the data voltage is supplied and dummy output channels to which at least any one of the data voltage and a common voltage is supplied; and
   a channel selecting part for selectively supplying any one of the data voltage and the common voltage to at least any one of the dummy output channels.

2. The liquid crystal display device according to claim 1, wherein the channel selecting part includes:
   a selection signal receiving part to which a channel selection signal is supplied; and
   first and second AND gates for selecting any one of a digital data for generating the data voltage and a digital common signal for generating the common voltage in accordance with a channel selection signal from the selection signal receiving part.

3. The liquid crystal display device according to claim 2, wherein the first and second AND gates are selectively driven in accordance with logic values which are contrary to each other.

4. The liquid crystal display device according to claim 2, further comprising:
   a digital/analog converter located between the channel selecting part and the output circuit for converting the digital signal selected by the channel selecting part into an analog signal.

5. The liquid crystal display device according to claim 2, wherein the liquid crystal display panel includes:
   a thin film transistor array substrate and a color filter array substrate located to face each other with a liquid crystal therebetween, and
   wherein the common voltage supplied to the at least any one of the dummy output channel is supplied through a silver dot to a common electrode formed on the color filter array substrate.

6. The liquid crystal display device according to claim 2, wherein the data drive integrated circuit is mounted on the liquid crystal display panel.

7. A liquid crystal display device, comprising:
   a liquid crystal display panel including a thin film transistor array substrate and a color filter array substrate sandwiching a liquid crystal therebetween;
   a data drive circuit for supplying a data voltage to data lines of the liquid crystal display panel;
   a gate drive circuit for supplying a gate signal to gate lines crossing the data lines of the liquid crystal display panel; and
   a timing controller for providing control signals to the data and gate drive circuits so as to selectively drive thin film transistors included in the thin film transistor array substrate,
   wherein the data drive circuit includes:
   an output circuit having a first set of output channels for supplying the data voltage to the data lines and having a second set of output channels for supplying a common voltage to the color filter array substrate.

8. The liquid crystal display device according to claim 7, wherein the data drive circuit further includes:
   a channel selecting part for selectively supplying the common voltage to at least any one of the second set of output channels.

9. The liquid crystal display device according to claim 8, wherein the channel selecting part includes:
- a selection signal receiving part to which a channel selection signal is supplied; and
- first and second AND gates for selecting any one of a digital data for generating the data voltage and a digital common signal for generating the common voltage in accordance with a channel selection signal from the selection signal receiving part.

10. The liquid crystal display device according to claim 9, wherein the first and second AND gates are selectively driven in accordance with logic values which are contrary to each other.

11. The liquid crystal display device according to claim 9, further comprising:
- a digital/analog converter located between the channel selecting part and the output circuit for converting the digital signal selected by the channel selecting part into an analog signal.

12. The liquid crystal display device according to claim 9, wherein the common voltage is supplied through a silver dot to a common electrode formed on the color filter array substrate.

* * * * *